United States Patent

Gerstung et al.

[11] Patent Number: 5,944,767
[45] Date of Patent: *Aug. 31, 1999

[54] DEVICE AND METHOD FOR CONTROLLING AN INTERNAL COMBUSTION ENGINE

[75] Inventors: Ulrich Gerstung, Vaihingen; Edwin Eberlein; Josef Newald, both of Stuttgart; Bernd Illg, Eppingen, all of Germany; Felix Forster; Stefan Poledna, both of Wien, Austria; Eric Schmidt, Grosskrut, Austria

[73] Assignee: Robert Bosch GmbH, Stuttgart, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/656,225

[22] PCT Filed: Sep. 22, 1995

[86] PCT No.: PCT/DE95/01307

§ 371 Date: Aug. 20, 1996

§ 102(e) Date: Aug. 20, 1996

[87] PCT Pub. No.: WO96/12099

PCT Pub. Date: Apr. 25, 1996

[30] Foreign Application Priority Data

Oct. 12, 1994 [DE] Germany ............................. 44 36 371

[51] Int. Cl.⁶ .................................................... G06G 7/70
[52] U.S. Cl. .......................... 701/102; 701/101; 701/29; 701/35; 340/438
[58] Field of Search .................... 364/431.01, 431.03, 364/431.04, 431.11, 431.12, 424.04, 424.037, 424.038, 550, 551.01, 423.098; 395/601, 602, 620, 621, 610, 607, 604, 615, 441, 440, 792, 803, 185.01; 701/29, 30, 35, 101, 102, 114, 115; 340/438

[56] References Cited

U.S. PATENT DOCUMENTS

| | | | |
|---|---|---|---|
| 4,677,558 | 6/1987 | Bohmler et al. | 701/102 |
| 4,821,175 | 4/1989 | Hikita et al. | 364/136 |
| 4,896,259 | 1/1990 | Jacobs et al. | 364/136 |
| 4,896,263 | 1/1990 | Brauninger et al. | 395/200.52 |
| 4,939,652 | 7/1990 | Steiner | 364/424.04 |
| 4,956,777 | 9/1990 | Cearly et al. | 364/424.028 |
| 5,033,010 | 7/1991 | Lawrence et al. | 364/550 |
| 5,138,548 | 8/1992 | Kienle | 395/185.01 |
| 5,185,700 | 2/1993 | Bezos et al. | 364/424.04 |
| 5,379,391 | 1/1995 | Belsan et al. | 395/441 |
| 5,414,626 | 5/1995 | Boorse et al. | 364/424.037 |
| 5,436,837 | 7/1995 | Gerstrung et al. | 364/424.034 |
| 5,638,273 | 6/1997 | Coiner et al. | 364/424.04 |

FOREIGN PATENT DOCUMENTS

| | | |
|---|---|---|
| 2 591 778 | 6/1987 | France . |
| 3723024 | 1/1989 | Germany . |
| 40 12 003 | 10/1990 | Germany . |
| 2 247 757 | 3/1992 | United Kingdom . |
| WO 87 06975 | 11/1987 | WIPO . |

Primary Examiner—Jacques H. Louis-Jacques
Attorney, Agent, or Firm—Kenyon & Kenyon

[57] ABSTRACT

The description relates to a process and a device for controlling internal combustion engines in motor vehicles with at least one microprocessor. Two data records may be written into a first store. An identification signal may be written into a preferred storage cell of each data record.

30 Claims, 3 Drawing Sheets

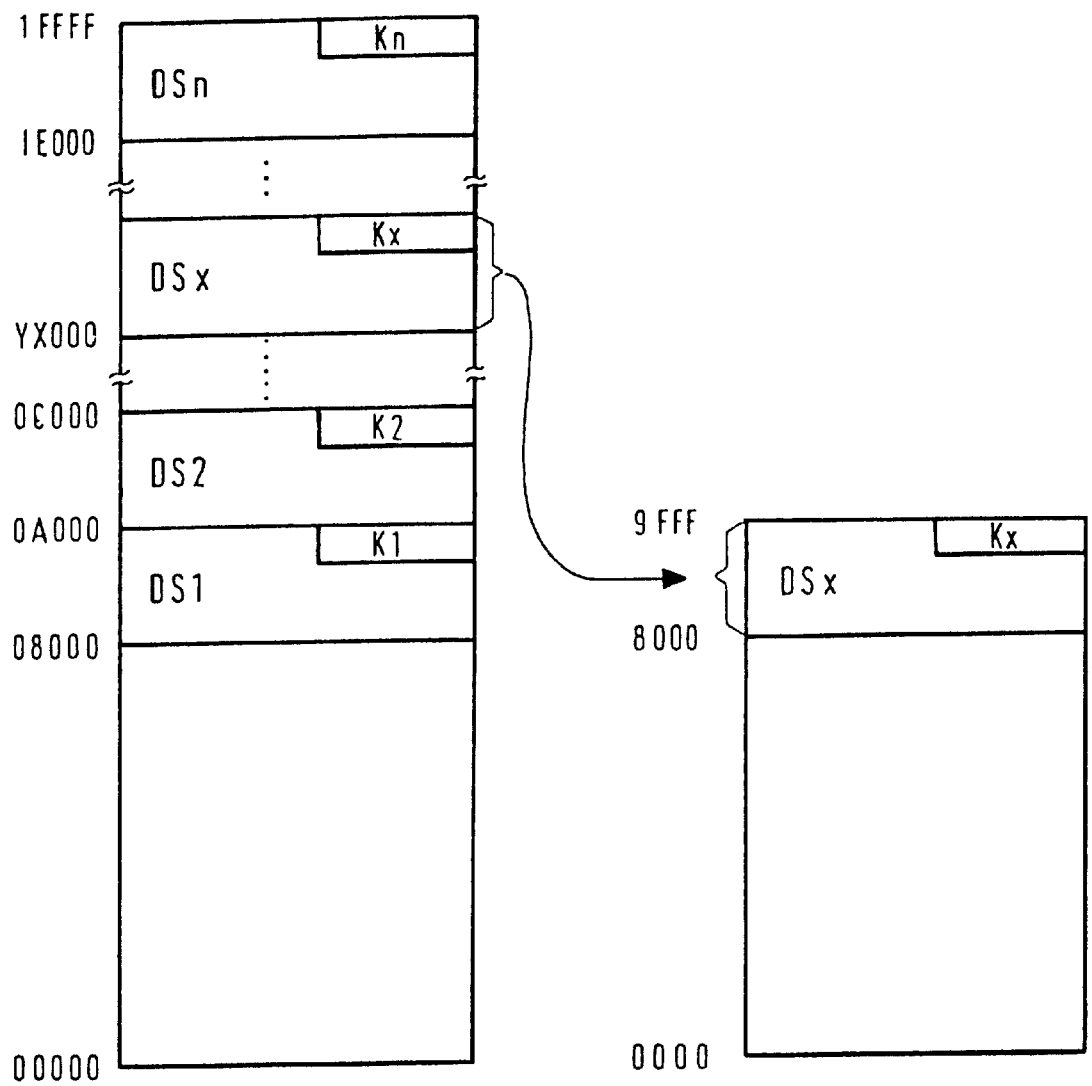
F I G. 2

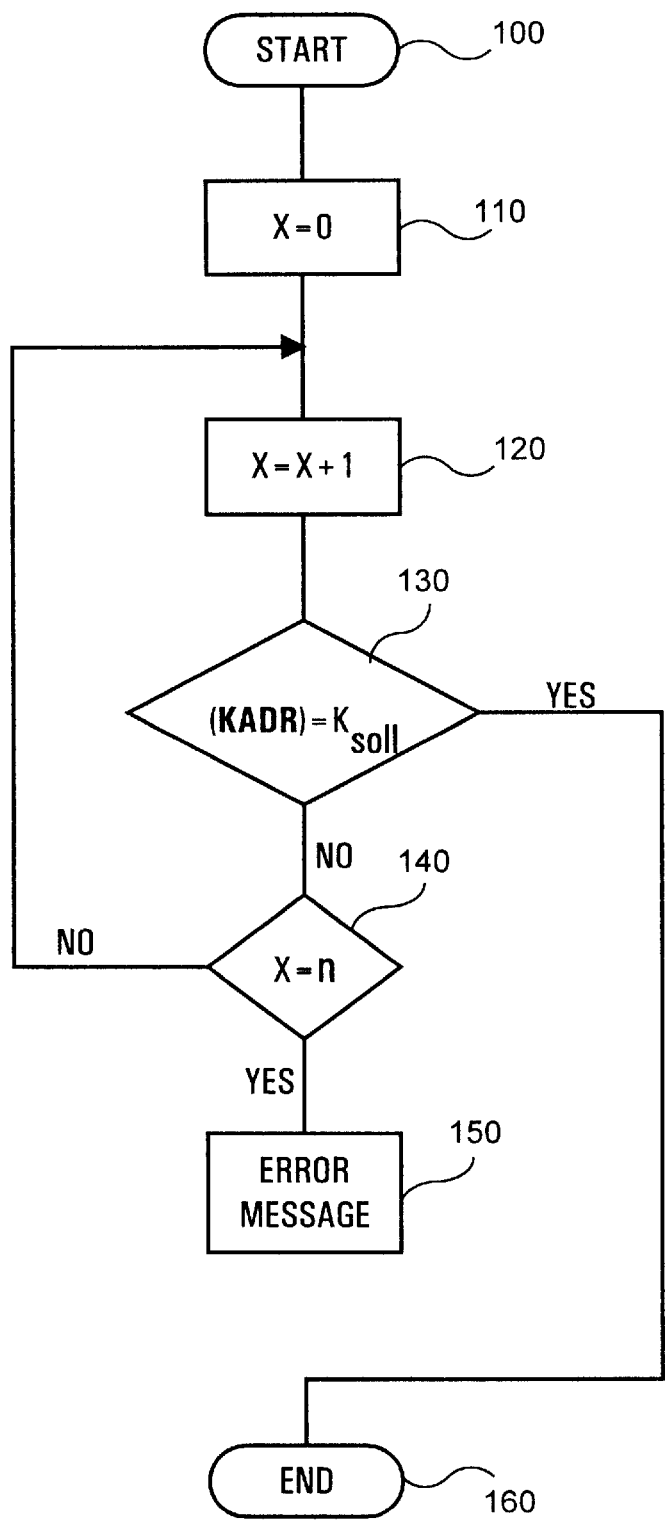
F I G. 3

DEVICE AND METHOD FOR CONTROLLING AN INTERNAL COMBUSTION ENGINE

FIELD OF THE INVENTION

The present invention relates to a method and a device for controlling an internal combustion engine having a microprocessor and a memory. Specifically, the present invention relates to data records stored in the memory for controlling the engine.

BACKGROUND INFORMATION

A method and a device for controlling an internal combustion engine are disclosed by the German Published Unexamined Application DE-OS 37 23 024 (U.S. Pat. No. 5,138,548). It likewise describes a device for controlling an internal combustion engine in motor vehicles which contain at least one microprocessor. Multiple variants of data records are stored under various retrieval codes in at least one first memory device. Under this prior art, the addresses of the individual data records must be known and stored in a so-called vector field.

In addition, devices and methods are known whereby the complete data record or portions of the data record are programmed in at the end of the manufacturing. The inherent disadvantage of these known devices is that means must be provided for selecting the correct data record on the basis of the stored addresses where the data are stored.

It is desirable in this case to be able to use one control unit for a plurality of vehicle variables. This would make it possible to simplify the stocking of the control units. It should be possible to select the appropriate variables after the control unit is installed in the vehicle. Thus, it can be provided, for example, for vehicles of one type to be equipped with manual transmission or with automatic transmission, with or without an ASR (traction control system). Furthermore, different rating classes can also be variables.

Because an identifier code is stored at a defined location of each vehicle-specific data record, it is possible for the data records to be arranged arbitrarily in the physical memory. To access the data during later operation, e.g. to modify them, one simply needs to know the identifier and not the address in the memory.

Furthermore, mix-ups can be ruled out, particularly in customer service. Also, for a later generation of control units, it will be possible to store the data records at different addresses.

SUMMARY OF THE INVENTION

In an exemplary embodiment of the present invention, a device and method are provided for controlling an internal combustion engine having at least one microprocessor. At least two data records are stored in a first memory device and an identifier may be entered in preferred location within each data record. Further, a selection value may be stored in a second memory device. Specific data records may be selected by the microprocessor using the identifier and the selection value. As a result, the variable coding is simplified

BRIEF DESCRIPTION OF THE DRAWINGS

One exemplary embodiment of the invention is elucidated on the basis of the drawings.

FIG. 2 the structure of the data stored in the control unit; and

FIG. 3 a flow chart of the method according to the invention.

DETAIL DESCRIPTION

Figure 1:
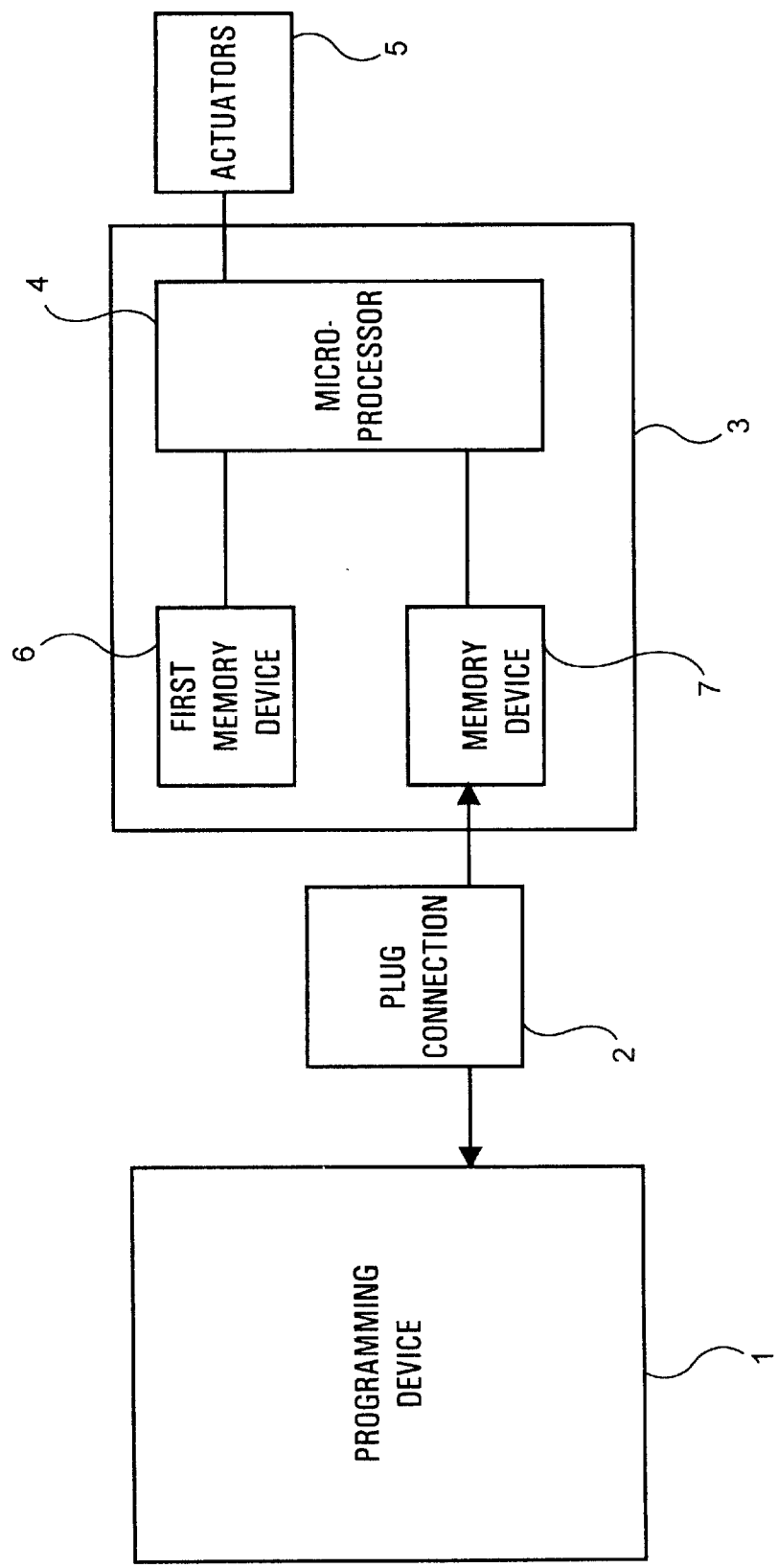
FIG. 1 shows a block diagram of a control unit in accordance with the invention.

The control scheme of the sort described here involves an electronic control with at least one microprocessor, and at least one first and second memory device. These control units are installed at the appropriate location during manufacture of a vehicle. The control units are identical for various vehicle types and models. They contain calculation programs, e.g. for various engine control data, such as the fuel quantity to be injected, as well as a program for selecting the data required for the calculation programs. These so-called basic programs are stored in a permanently programmed memory of the control unit.

At the end of a motor vehicle assembly line, the user of the control unit, the motor vehicle manufacturer, can input the vehicle-specific data into the freely programmable memory of the control unit. To do this, there is no need to open the control unit, which is sealed off hermetically to protect it from external influences. In the described exemplary embodiment, the data for the different variables of vehicles are likewise preferably stored in a permanently programmable memory.

To select a desired data record, the control unit, as shown in FIG. 1, is linked via a plug connection to a programming device, a so-called programming station.

FIG. 1 depicts a block diagram, in which a programming device 1 is connected via a plug connection 2 to a control unit 3. The control unit essentially comprises a microprocessor 4, which is connected to a first memory device 6 and a second memory device 7. The microprocessor preferably applies trigger signals to an actuator 5.

The programming device 1 is connected via a line to the second memory device 7. The programming device 1 enables data to be modified/programmed in the memory device 7. In a first step, on the basis of data stored in the second memory device 7, the control unit 3 selects a specific data record of the data stored in the first memory device. Based on these data and on reference parameters acquired by sensors, the microprocessor 4 calculates trigger signals to be applied to actuators 5, used, e.g., to control the injected quantity of fuel. For the sake of simplicity, connections of the control unit leading to sensors and other actuators of the motor vehicle are not reproduced in the illustration.

It is especially advantageous for the first memory device to be realized as a programmable memory, in particular as an E-PROM or a ROM.

When working with the second memory device, preferably a freely programmable memory, in particular an $E^2$-PROM is used.

The various data records, which are stored in the first memory device 6, occupy various memory areas. This occupancy is shown by way of example in FIG. 2. Here, the distinction has to be made between physical addresses and virtual addresses. The data record DS1 is stored between the memory locations 08000 and the memory locations 0A000. The data record DS2 for another variant is stored between the memory location 0A000 and the memory location 0C000. These are followed by other data records. A data record DSX, which contains the data of the x-th variant, is stored starting from the memory location YX000 on. The last data record DSN is stored between the memory location 1E000 and 1FFFF.

It is now provided in accordance with the invention for an identifier, in particular a code number, to be stored in a specific memory location of each data record. This code number is designated as K1 for the first record, as K2 for the second, as KX for the x-th, and as KN for the n-th data record. At this point, the invention provides for this identifier to be stored at a defined address KADR of the particular data record. This means the identifier is stored in a preferred memory location of each data record. Thus, it can be provided, e.g., for the identifier to be stored in the first memory location of the area. In another refinement, a value or a plurality of values are stored in the first memory location, indicating that a new data record begins from this memory location on. The identifier is then stored in the next memory location following this memory location or memory locations.

During manufacturing of the control unit, all possible data records of this type are stored in the first memory device 6. When production of a specific vehicle is complete, the control unit is linked to the programming device 1, and a selection value $K_{setpoint}$ ($K_{soll}$) is stored in the second memory element. This selection value $K_{setpoint}$ denotes the vehicle variable. It is also possible for a plain ASCII text, such as type 1, to be stored as a selection value.

Using the selection value, the microprocessor now selects the correct data record from the first memory device 6. This takes place as illustrated in the flow chart of FIG. 3.

Following the start step 100, in which the selection value is read out from the memory device 7, a counter x is set to 0 in step 110. The counter x is subsequently incremented by 1 in step 120, and the x-th data record DSX is selected. The query 130 checks whether the contents of the memory location associated with the address KADR correspond to the selection value $K_{setpoint}$ stored in the second memory device 7.

If the query 130 recognizes that the two values are the same, then the program ends in step 160. If they are not the same, step 140 checks whether the counter is greater or equal to the maximum number n of the data records. If this is not the case, then the program continues with step 120. If the last data record is reached, an error message is output in step 150, indicating that the corresponding data record is not stored in this control unit.

The data record to be used is selected by comparing the identifier stored at the address KADR of each data record to the selection value input at the end of the assembly line in the second memory device.

The data records may be compiled arbitrarily in the first memory device. The data records can be stored in any desired sequence. To retrieve a data record, it is not necessary for the address in the memory to be known. Therefore, a specific data record can be accessed and modified very simply in customer service as well. This obviates any mix-ups due to changing data records and addresses of the data records.

When changes are made to the newest data record of a current model, it is especially advantageous for the data record to be inserted at the uppermost location of the memory device. The memory device can be clearly identified by checking the uppermost data record.

Thus, for example, a check-sum adjustment can be made on the basis of each individual data record, since no additional code number is needed to identify the memory device.

In addition, it is possible to have a mixed bag of different modification states, since it can always be ascertained whether the desired variable is available in the control unit.

We claim:

1. A method for controlling an internal combustion engine in a motor vehicle having at least one microprocessor, comprising the steps of:
    storing at least two data records in a first memory device, each of the data records having an identifier, including a coded bit pattern for marking an identity of a data record, stored in a same predetermined relative location within each of the data records; and
    controlling the internal combustion engine as a function of the data records.

2. The method of claim 1, further comprising the step of:
    storing a selection value in a second memory device.

3. The method of claim 2, further comprising the step of:
    selecting a specific data record from the stored data records based on the identifier and the selection value.

4. The method of claim 3, wherein the selecting step includes the step of:
    selecting the specific data record if the identifier and the selection value are equivalent.

5. The method of claim 3, wherein the first memory device is a programmable memory.

6. The method of claim 5, wherein the second memory device is a freely programmable memory device.

7. The method of claim 1, wherein each of the data records is a contiguous block of memory locations for a storage of data and program instructions and the identifier.

8. The method of claim 1, wherein the same predetermined relative location is at least one memory location within a data record, the at least one memory location being located a fixed number of memory locations from a first memory location in the data record.

9. The method of claim 1, wherein the coded bit pattern is based upon a system for a storage of text based information.

10. The method of claim 1, wherein the coded bit pattern is based upon the American Standard Code for Information Interchange (ASCII).

11. A system for controlling an internal combustion engine in a motor vehicle, comprising:
    a first memory device having at least two data records stored therein,
    each of the data records having an identifier, including a coded bit pattern for marking an identity of a data record, stored in a same predetermined relative location within each of the data records; and
    a microprocessor coupled to the first memory device for controlling the internal combustion engine as a function of at least one of the at least two data records.

12. The system of claim 11, wherein the first memory device is a programmable memory.

13. The system of claim 12, further comprising:
    a freely programmable memory device.

14. The system of claim 11, wherein each of the data records is a contiguous block of memory locations for a storage of data and program instructions and the identifier.

15. The system of claim 11, wherein the same predetermined relative location is at least one memory location within a data record, the at least one memory location being located a fixed number of memory locations from a first memory location in the data record.

16. The system of claim 11, wherein the coded bit pattern is based upon a system for a storage of text based information.

17. The system of claim 11, wherein the coded bit pattern is based upon the American Standard Code for Information Interchange (ASCII).

18. A method for storing and retrieving data records, for controlling an internal combustion engine comprising the steps of:

storing at least two data records in a first memory device, each of the data records having an identifier, including a coded bit pattern for marking an identity of a data record, stored in a same predetermined relative location within the data records, each of the data records further having at least one engine control variable stored therein;

storing a selection value in a second memory device;

comparing the selection value to the identifier stored in at least one of the data records;

retrieving the at least one of the data records when the selection value matches the identifier stored in the at least one of the data records; and controlling the internal combustion engine as a function of the retrieved at least one of the data records.

19. The method of claim 18, wherein the first memory device is a programmable memory.

20. The method of claim 19, wherein the second memory device is a freely programmable memory.

21. The method of claim 18, wherein each of the data records is a contiguous block of memory locations for a storage of data and program instructions and the identifier.

22. The method of claim 18, wherein the same predetermined relative location is at least one memory location within a data record, the at least one memory location being located a fixed number of memory locations from a first memory location in the data record.

23. The method of claim 18, wherein the coded bit pattern is based upon a system for a storage of text based information.

24. The method of claim 18, wherein the coded bit pattern is based upon the American Standard Code for Information Interchange (ASCII).

25. A method for controlling an internal combustion engine in a motor vehicle having at least one microprocessor, comprising the steps of:

storing at least two data records in a first memory device, each data record occupying a distinct and contiguous set of memory locations;

storing an identifier in a same predetermined relative memory location of each data record;

storing a selection value in a second memory device;

selecting a matching data record using the selection value and the identifier stored in the predetermined relative memory location of each data record; and controlling the internal combustion engine as a function of the selected matching data record.

26. The method of claim 25, wherein the matching data record is selected by locating the data record in which the identifier stored in the predetermined relative memory location is equal to the selection value.

27. A device for controlling an internal combustion engine in a motor vehicle comprising:

at least one microprocessor;

a first memory device for storing at least two data records, each data record occupying a distinct and contiguous set of memory locations and containing a same predetermined relative memory location for storing an identifier;

a second memory device for storing a selection value;

the at least one microprocessor being adapted to select a matching data record using the selection value and the identifier stored in the predetermined relative memory location of each data record, and to control the internal combustion engine as a function of the selected matching data record.

28. The device of claim 27, wherein the first memory device is an erasable programmable read only memory (EPROM).

29. The device of claim 27, wherein the first memory device is a read only memory (ROM).

30. The device of claim 27, wherein the first memory device is an electrically erasable programmable read only memory (E2PROM).

* * * * *